United States Patent [19]

Muchow

[11] Patent Number: 4,531,545
[45] Date of Patent: Jul. 30, 1985

[54] DRILLING CHOKE VALVE

[75] Inventor: John D. Muchow, Long Beach, Calif.

[73] Assignee: Hydril Company, Los Angeles, Calif.

[21] Appl. No.: 481,739

[22] Filed: Apr. 4, 1983

[51] Int. Cl.³ .............................................. F16K 47/04
[52] U.S. Cl. ................................ 137/625.39; 251/191; 251/210
[58] Field of Search ............... 251/210, 359, 357, 356, 251/158, 191; 137/625.39, 625.38

[56] References Cited

U.S. PATENT DOCUMENTS

| 1,588,645 | 6/1926 | Barrett | 251/210 |
| 1,833,629 | 11/1931 | Yarnall . | |
| 2,676,781 | 4/1954 | Hobbs | 251/210 |
| 2,830,620 | 4/1958 | Shuptrine | 251/210 X |
| 3,211,419 | 10/1965 | Klinger-Lohr | 251/191 X |
| 4,134,572 | 1/1979 | Schmidt | 251/359 X |
| 4,226,263 | 10/1980 | Muchow . | |
| 4,355,784 | 10/1982 | Cain . | |

FOREIGN PATENT DOCUMENTS

| 1133199 | 7/1962 | Fed. Rep. of Germany | 251/210 |
| 2646837 | 4/1978 | Fed. Rep. of Germany . | |
| 1211264 | 10/1959 | France | 251/210 |
| 915063 | 1/1963 | United Kingdom . | |
| 971318 | 9/1964 | United Kingdom . | |

OTHER PUBLICATIONS

Valves Concepts International Catalog 829-entitled Chokes & Valves.
European Patent, (Application No. PCT/US 84/00479), International Search Report.

Primary Examiner—Arnold Rosenthal
Attorney, Agent, or Firm—William W. Haefliger

[57] ABSTRACT

A multiposition choke valve assembly comprises:
  (a) a valve body defining an interior chamber and inlet and outlet flow ports communicable with that chamber,
  (b) a valve stopper sub-assembly movable axially longitudinally in the chamber, the sub-assembly including an axially extending stem, an axially extending sleeve, an annular section located between the stem and sleeve, and an annular seal on the annular section and exposed at the section periphery,
  (c) the sleeve forming multiple through openings and having a retracted position in which the flow passes with relatively lesser velocity past the seal and then forwardly to pass via such openings with relatively increased velocity into the sleeve, followed by generally axially forward flow toward the outlet flow port,
  (d) the sleeve having an advanced position in which the seal is radially compressed to engage a body bore, and the flow through the sleeve openings is blocked.

8 Claims, 8 Drawing Figures

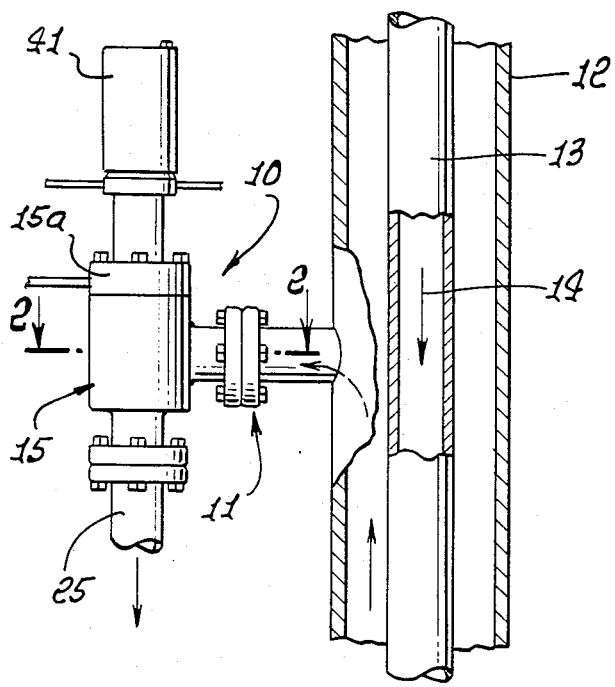
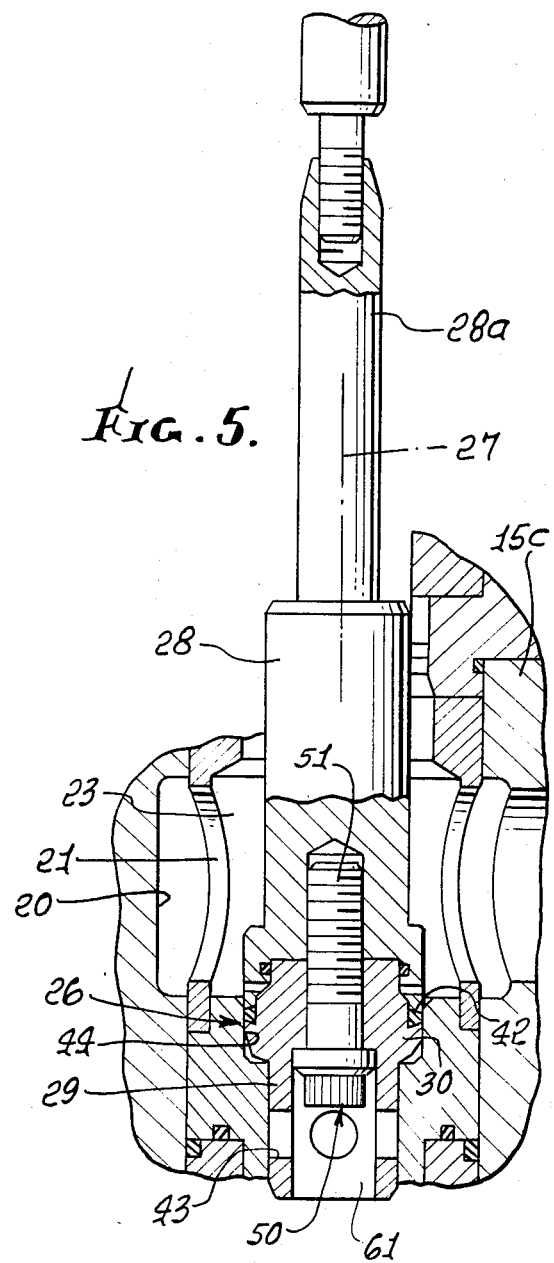
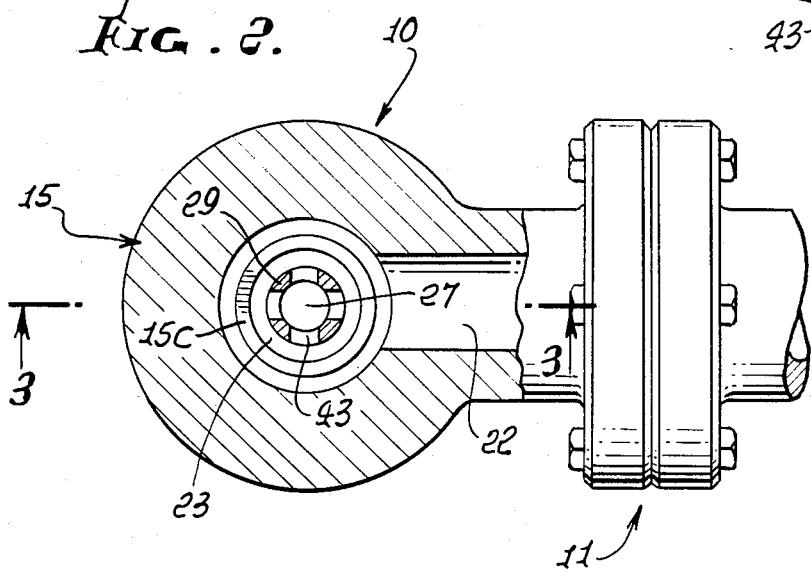

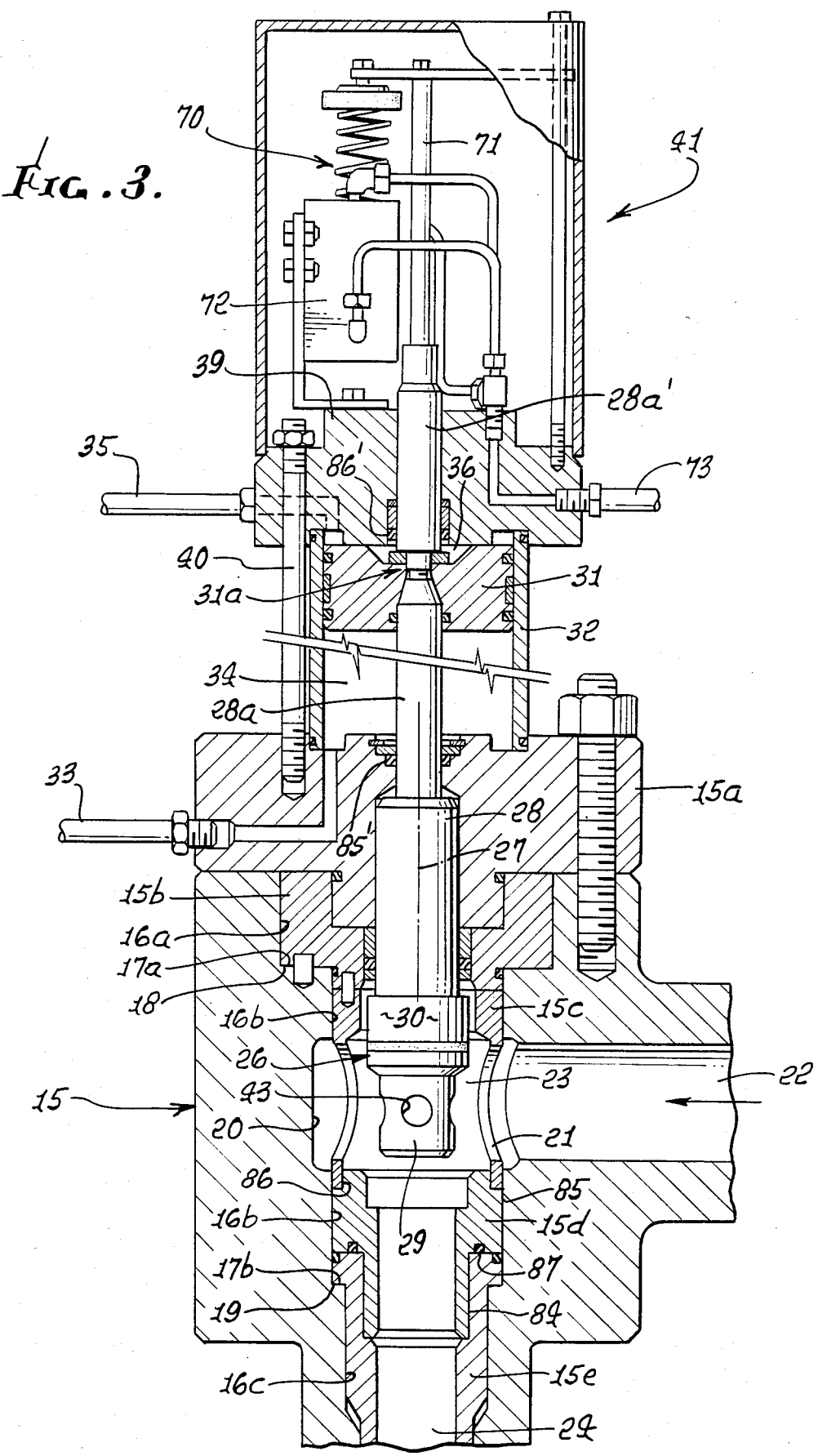

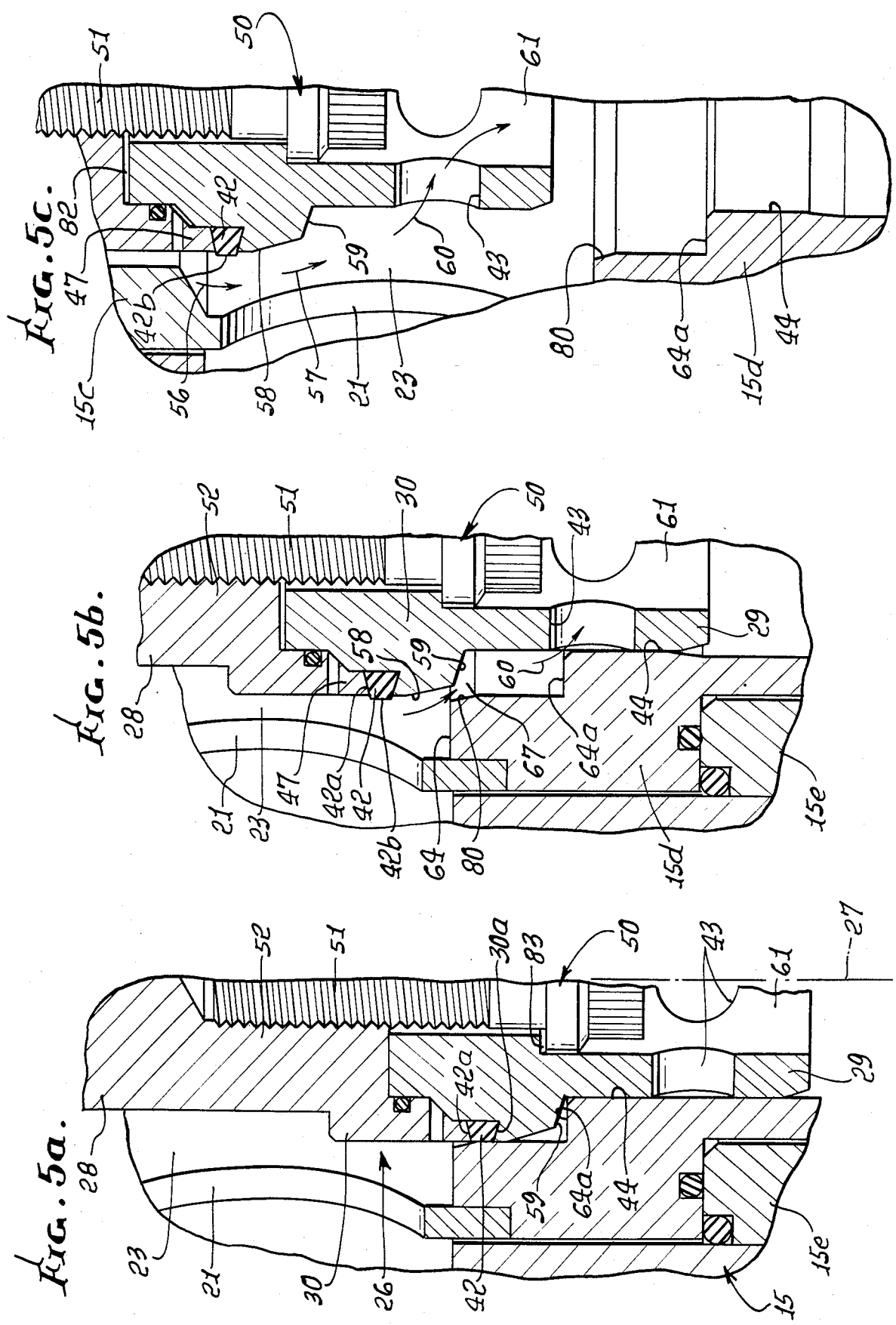

DRILLING CHOKE VALVE

BACKGROUND OF THE INVENTION

This invention relates generally to control valves, and more particularly to chokes which serve to dissipate the energy of high pressure fluid, as for example fluid rising in a well.

Choke valves are commonly connected to the well annulus at the well surface to dissipate the energy of high pressure fluid, the latter commonly entraining small particles including drill cuttings loosened from the underground well formation. Such material can and does destructively erode the non-metallic seal carried by the choke valve due to exposure of the seal to the fluid flow when the valve is partly open, i.e. in fluid energy dissipating position. In this regard, when the valve is closed the seal is not exposed to abrasive fluid flow as the latter is stopped. There is need for a valve construction characterized by substantially reduced seal erosion and correspondingly increased life. Also, there is need for a choke valve construction further characterized by unusual simplicity and overall improved design, for compatibility with suddenly high well fluid pressure, as during a 'kick' in the mud flow upwardly in the annulus between the well casing and drill pipe.

SUMMARY OF THE INVENTION

It is a major object of the invention to provide an improved choke valve meeting the above needs. Basically, the multiposition choke valve assembly of the invention includes, in combination:

(a) a valve body defining an interior chamber and inlet and outlet flow ports communicable with that chamber, (b) a valve stopper sub-assembly movable axially longitudinally in the chamber, the sub-assembly including an axially extending stem, an axially extending sleeve, an annular section located between the stem and sleeve, and an annular seal on said annular section and exposed at the section periphery, (c) the sleeve forming multiple through openings and having a retracted position in which the flow passes with relatively lesser velocity past the seal and then forwardly to pass via said openings with relatively increased velocity into the sleeve, followed by generally axially forward flow toward the outlet flow port, (d) the sleeve having an advanced position in which the seal is radially compressed to engage a body bore, and said flow through said sleeve openings is blocked.

As will appear, the annular section typically comprises a metal flange, the seal being non-metallic and having a compressible outer cylindrical surface the diameter of which is greater than the sleeve outer diameter. Accordingly, as the flow passes the seal and flange it has reduced velocity relative to its velocity when passing through the sleeve openings to dissipate energy within the sleeve, such reduced velocity at the seal being associated with reduced wear of the seal resulting from its contact of with entrained particulate. The seal is typically located remotely from the sleeve, i.e. with the flange projecting protectively therebetween, the flange shaped to aid acceleration of the flow beyond the seal and toward the sleeve.

Additional objects include the provision of an actuator movable axially with the sub-assembly to effect seal compression in advanced position of the sleeve (i.e. after closing of the sleeve ports, so that flow is interrupted before the seal arrives at a position where it is directly in the flow path).

These and other objects and advantages of the invention, as well as the details of an illustrative embodiment, will be more fully understood from the following specification and drawings, in which:

DRAWING DESCRIPTION

FIG. 1 is an elevation showing a choke valve connected with a well installation;

FIG. 2 is an enlarged horizontal view, partly in section, taken on lines 2—2 of FIG. 1;

FIG. 3 is a section in plane view on lines 3—3 of FIG. 2; showing the choke valve fully open;

FIG. 5 is a further enlarged view showing details of valve elements during full closure;

FIG. 5a is a yet further enlarged fragmentary section showing details of valve elements during full closure;

FIG. 5b is a view like FIG. 5a showing details of valve elments, as related to flow during partial closure of the valve; and FIG. 5c is a view like FIG. 5b, the valve being fully open.

DETAILED DESCRIPTION

Figure 4:
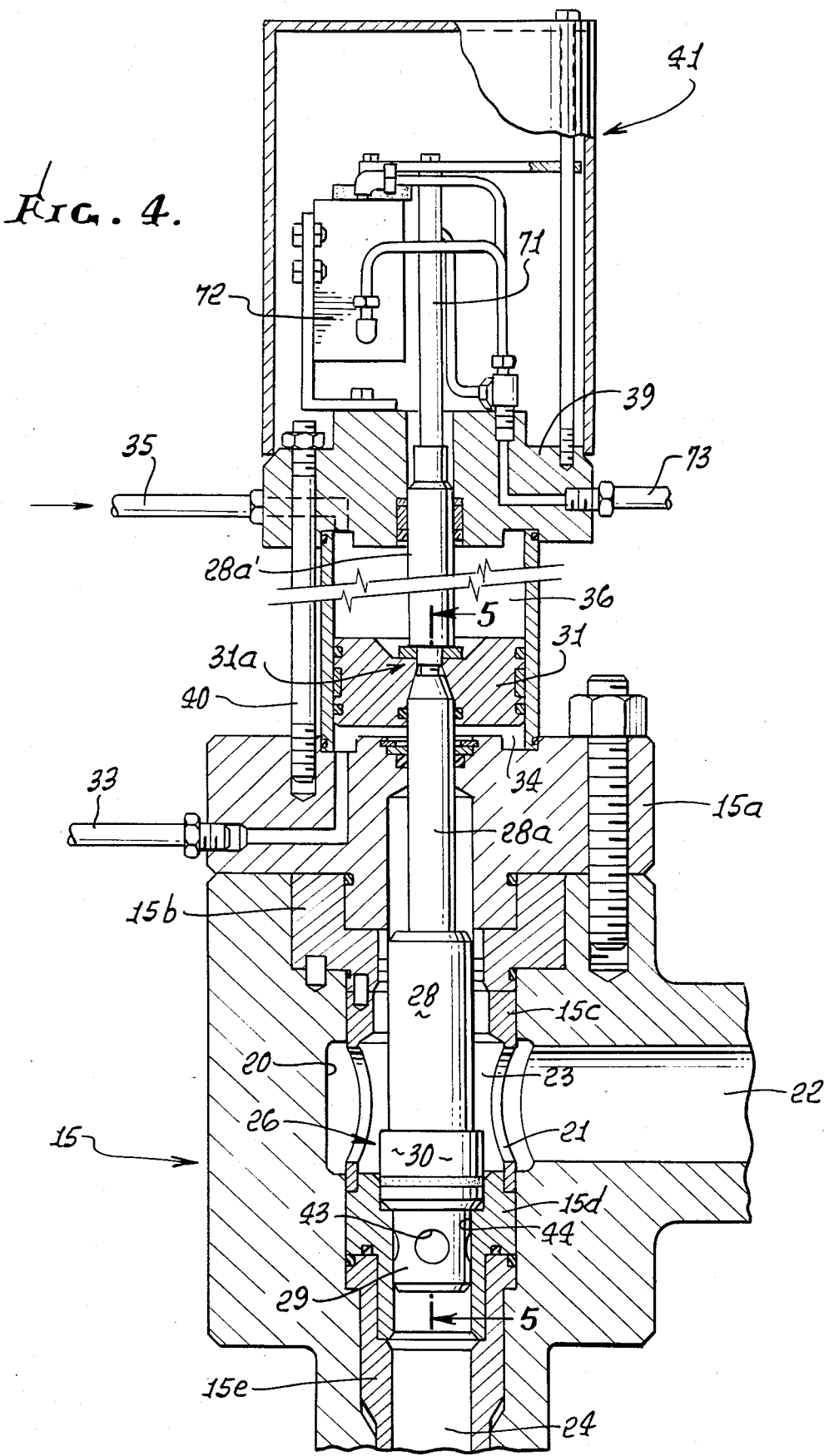
FIG. 4 is a view like FIG. 3, showing the choke valve fully closed.

Referring first to FIG. 1, a choke valve 10 is shown as sidewardly connected at 11 to a well casing 12, to receive pressurized fluid, as for example highly pressurized drilling mud typically containing sand or other particulate. The casing typically contains drill pipe 13 via which mud is circulated downwardly, as indicated by arrow 14.

Extending the description to FIGS. 2 and 3, the illustrated choke valve 10 is shown to include a valve body 15, a body cap 15a, and interfitting annular members 15b, 15c, 15d and 15e. The latter are received in body bores 16a–16c, as shown. Body stop shoulders 17a and 17b seat flange surfaces 18 and 19 on members 15b and 15e, respectively, and cap 15a retains the members 15b—15e in position.

A chamber 20 is formed interiorly of the body 15 to extend annularly about an intermediate portion of member 15c. The latter has a number of ports 21 through its wall, so that fluid received via body side inlet port 22 into annular chamber 20 is passed via ports 21 into the interior space 23 within member 15c. The latter is communicable with outlet port 24 to discharge fluid, as via line 25, to a sump or other area.

A valve stopper sub-assembly is provided as at 26 to be movable longitudinally in the direction of axis 27 in chamber 20 and space 23. That sub-assembly includes an axially extending stem 28, an axially extending sleeve 29, and an annular section, as for example flange 30, located between stem 28 and sleeve 29. An actuator to move the stem and sleeve axially may for example include a piston 31 attached at 31a to the reduced diameter stem extension 28a, the piston movable in one direction within cylinder 32 in response to control fluid pressure applied via line 33 to chamber 34 in cylinder; and the piston is movable in the opposite direction within cylinder 32 in response to control fluid pressure application via line 35 to chamber 36 in the cylinder. One end of the cylinder 32 is retained to cap 15a as by a head 39 closing the opposite end of the cylinder, and fasteners 40 connected to the head and cap. See also seal 85' between cap 15a and stem extension 28a, and seal 86' between head 39 and stem further extension 28a'.

Extending the description to FIGS. 5a to 5c, the metallic flange 30 carries an annular seal 42, which may for example consist of elastomeric material. Flange 30 and sleeve 29 may typically consist of wear resistant material, i.e. tungsten carbide; and member 15d may also consist of such material. The seal is located at a side 30a of the flange remote from the sleeve 29, the latter for example being integral with the flange. The seal may have dove tail or undercut interfit with side 30a of the flange, to aid its retention to the flange.

The sleeve forms multiple through openings 43 spaced about axis 27, for directing divided fluid flow streams into the sleeve interior to impinge upon one another and dissipate (i.e. choke) flow energy, in retracted positions of the sleeve and sub-assembly 26 (see FIGS. 3 and 5b). In this regard, as the sub-assembly is advanced the openings 43 are progressively closed by the bore wall 44, to reduce the flow discharge at 25. In fully advanced position of the sleeve, (see FIGS. 4 and 5a) the side openings 43 are closed off by bore wall 44; and the seal is squeezed or compressed radially to forcibly seal against wall (counterbore) 44, fully closing off the flow through the valve. To this end, an actuator is provided to extend against the tapered side 42a of the seal. The illustrated actuator 47 is cylindrical and has a tapred forward surface interfitting the seal wall 42a. A retainer such as fastener 50 retains the actuator to the annular section or flange 30 for axial movement therewith between sleeve advanced and retracted positions. The retainer is thread connected at 51 to the actuator body 52, for adjusting the axial compression of the seal, to achieve desired fit with bore wall 44.

It is an important feature of the invention that, due to the mounting of the seal on flange 30 so as to be substantially larger in outer diameter than the sleeve 29, the fluid flow is caused to pass with relatively lesser velocity past the seal (see arrow 56 in FIG. 5c), and then forwardly with relatively increased velocity (see arrow 57 in FIG. 5c) past the tapered end walls 58 and 59 of the flange, to pass at 60 through the openings 43 into the sleeve interior space 61, where the flow streams impinge upon one another. The flow then passes generally axially toward the discharge at 25. As a result, abrasive particles in the flow past with lesser velocity near to or against the seal, so that lesser seal wear results, and seal life is enhanced. Also, with the valve sub-assembly set in flow reduced position as seen in FIG. 5b, with the flange 30 close to end face 64 of member 15d, the seal remains sufficiently spaced from that end face, so that abrasive particles too large to pass through the gap 67 between 58 and 80 (see FIG. 5b) are trapped out of contact with the seal, whereby seal wear is reduced or prevented. Gap 67 is smaller in width than the widths of other gaps or openings down stream of gap 67 to ensure that any particle passing through gap 67 will not be further trapped. If flushing of such larger particles is desired the sub-assembly may be moved upwardly, slightly. Note counterbore 44 in FIG. 5, receiving the flange 30. However, gap 67 is larger in area than the flow passing areas of the downstream through openings. In full open position as shown in FIG. 5c, the valve can pass large cuttings with no entrapment areas. As the sleeve and flange move forwardly, the seal annular outer surface 42b engages annular forward taper 80 on the member 15d, which progressively squeezes the seal to compress it radially, as is clear from FIGS. 5a and 5c.

After flange taper 59 abuts to stops against member face 64a, stem 28 may be advanced further to close gap 82 in FIG. 5a (and open a corresponding gap at 83) to further pressurize the seal 42 and increase sal pressure on bore 44.

In addition, member 15d floats slightly, in position, due to clearances at 84, 85 and 86 in FIG. 3, so as to adjust radially on assembly to interfit with sleeve 29 as the latter advances. See also face seal 87 between floating member 15d and nonfloating member 15c. The following characteristics are of importance:

(a) In valve full open position, large cutting can pass,
(b) In mid-stroke position the valve acts like a gate or seat valve; or by adding a pair of holes as at 43, it acts like a jet choke,
(c) In fully closed position, the seal is energized on a large flange diameter for lower flow velocities.
(d) The stem end of sleeve 29 is sacrificial and may erode away by abrasion without preventing valve functioning.

FIGS. 3 and 4 also show the provision of a valve position sensing and measuring device indicated generally at 41. It includes an element 70 attached at 71 to stem extension 28a', and movable into and out of axial position sensor 72. A pressure line 73 communicates sensing fluid pressure (indicative of valve position) to an external meter or other recorder.

Finally, the sleeve 29 may be free of openings 29, and in that case it does provide a sacrificial erodable element, as referred to above.

I claim:

1. In a multiposition choke valve assembly, the combination comprising
   (a) a valve body defining an interior chamber and inlet and outlet flow ports communicable with that chamber,
   (b) a valve stopper sub-assembly movable axially longitudinally in the chamber, the sub-assembly including an axially extending stem, an axially extending sleeve, an annular section located between the stem and sleeve, and an annular seal on said annular section and exposed at the section periphery,
   (c) the sleeve forming multiple through openings and having a retracted position in which the flow passes with relatively lesser velocity past the seal and then forwardly to pass via said openings with relatively increased velocity into the sleeve, followed by generally axially forward flow toward the outlet flow port,
   (d) the sleeve having an advanced position in which the seal is radially compressed to engage a body bore wherein the seal is entirely received, and said flow through said sleeve openings is blocked,
   (e) said annular section comprising a flange, the seal being non-metallic and having an outer surface the diameter of which is greater than the outer diameter of said sleeve at said sleeve openings,
   (f) the flange projecting between the seal and sleeve and having an annular taper extending toward the sleeve to provide a gap with the body that controllably passes the fluid flow, which subsequently acelerates as it flows through said openings, the gap width being smaller than the widths of said openings and the gap area being grater than the flow passing areas of said openings,
   (g) wherein said body outlet flow port is axially spaced from the sleeve, and said body inlet flow port is located at a side of the body to direct the inlet flow toward the sleeve and said gap in retracted position of the sleeve, (h) said flange and sleeve consisting of wear resistant material, and said sub-assembly including an actuator movable to compress the seal axially, and located to retain the seal in position on the flange, (i) the actuator and sleeve having a lost motion connection so that the sleeve has limited movement relative to the flange for compressing the seal axially only after the seal and flange taper are fully received in said bore.

2. The choke valve assembly of claim 1 wherein said sub-assembly includes a retainer retaining said actuator to said flange for axial movement therewith.

3. The choke valve assembly of claim 1 including a stop shoulder on said annular section for compressive engagement with the valve body to block further forward motion of the annular section and sleeve in said advanced position of the sleeve, said compressive engagement being annular to provide a mechanical seal.

4. The choke valve of claim 1 wherein said body forms said bore to closely receive the sleeve, a counterbore to receive the flange and seal, and a stop shoulder between said bore and counterbore to stop forward displacement of the flange.

5. The choke valve of claim 1 wherein the sub-assembly has a position wherein said flange and body form a flow gap sufficiently small to trap particles in the flow, the seal spaced from said gap to be substantially out of contact with said particles.

6. The choke valve assembly of claim 1 including a body part defining said body bore to receive the seal, axially, said part having limited radial floating movement in said body to adjust to sleeve receptions in said part.

7. In a multiposition choke valve assembly, the combination comprising (a) a valve body defining an interior chamber and inlet and outlet flow ports communicable with that chamber, (b) a valve stopper sub-assembly movable axially longitudinally in the chamber, the sub-assebmly including an axially extending stem, an axially extending sleeve, an annular section located between the stem and sleeve, and an annular seal on said annular section and exposed at the section periphery, (c) the sleeve forming multiple through openings and having a retracted position in which the flow passes with relatively lesser velocity past the seal and then forwardly with relatively increased velocity past the sleeve, followed by generally axially forward flow toward the outlet flow port, (d) the sleeve being sacrificial to erode in response to contact therewith of fluid containing abrasive particles, (e) the sleeve having an advanced position in which the seal is radially compressed to engage a body bore wherein the seal is entirely received and said flow through said sleeve openings is blocked, (f) and including a stop shoulder on said annular section for compressive engagement with the valve body to block further forward motion of the annular section and sleeve in said advanced position of the sleeve, said compressive engagement being annular to provide a secondary mechanical seal, the body inlet flow port located at a side of the body to direct the inlet flow toward the sacrificial sleeve, said annular section comprising a flange, the sleeve being nonmetallic and having an outer surface the diameter of which is greater than the outer diameter of the sleeve at the sleeve openings, the flange projecting generally between the sleeve and seal and having an annular taper extending toward the sleeve to provide a gap with the body that controllably passes the fluid flow, which subsequently accelerates as it flows through said openings, the gap width being smaller than the width of said openings and the gap area being greater than the flow passing areas of each of said openings, and wherein the body outlet flow port is spaced from said sleeve, and said body inlet flow port is located at a side of the body to direct the inlet flow toward the sleeve and the gap in retracted position of the sleeve, the sub-assembly including an actuator movable to compress the seal axially, and located to retain the seal in position on the flange, (g) the annular section and sleeve having a lost motion connection so that the sleeve has limited axial movement relative to the seal for compressing the seal axially only after the seal is fully received in said body bore.

8. The choke valve assembly of claim 7 including a body part defining said body bore to receive the seal, axially, said part having limited radial floating movement in said body to adjust to sleeve receptions in said part.

* * * * *